N. KROHN.
BRAKE HANDLE.
APPLICATION FILED JUNE 3, 1919.

1,375,709.

Patented Apr. 26, 1921.
2 SHEETS—SHEET 1.

Inventor:
Nels Krohn
By Gillson & Gillson
Att'ys.

N. KROHN.
BRAKE HANDLE.
APPLICATION FILED JUNE 3, 1919.
1,375,709.
Patented Apr. 26, 1921.
2 SHEETS—SHEET 2.
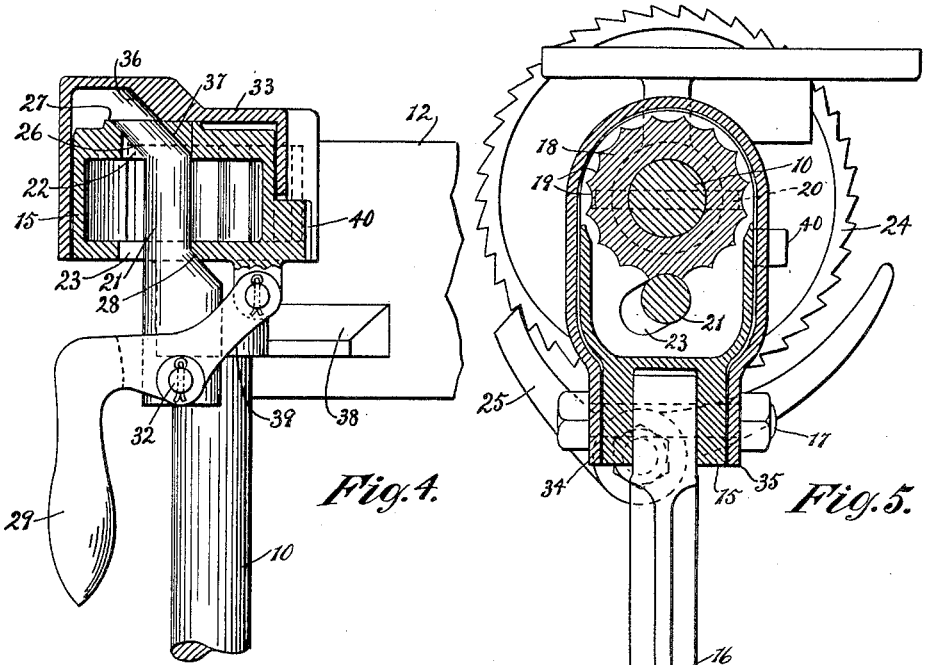
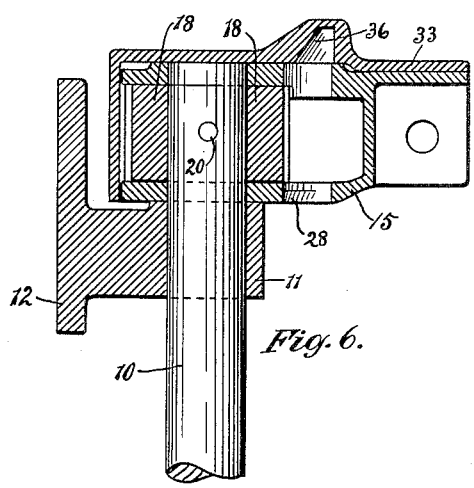
Inventor:
Nels Krohn
By Gibson & Gibson
Attys.

UNITED STATES PATENT OFFICE.

NELS KROHN, OF CHICAGO, ILLINOIS, ASSIGNOR TO THE ADAMS & WESTLAKE COMPANY, A CORPORATION OF ILLINOIS.

BRAKE-HANDLE.

1,375,709. Specification of Letters Patent. Patented Apr. 26, 1921.

Application filed June 3, 1919. Serial No. 301,501.

*To all whom it may concern:*

Be it known that I, NELS KROHN, a citizen of the United States, and resident of Chicago, county of Cook, and State of Illinois, have invented certain new and useful Improvements in Brake-Handles, of which the following is a specification, and which are illustrated in the accompanying drawings, forming a part thereof.

The invention relates to brake handles for railway cars, of the type in which the operating handle is connected with the brake shaft by clutch mechanism.

The objects of the invention are to simplify the construction and operation and improve the efficiency of devices of this type.

The invention consists in a structure such as hereinafter described, and illustrated in the accompanying drawings, in which—

Fig. 4 is a detail section on the line 4—4 of Fig. 3;

Fig. 5 is a sectional view on the line 5—5 of Fig. 4; and

Fig. 6 is a detail section on the line 6—6 of Fig. 3.

Figure 1:
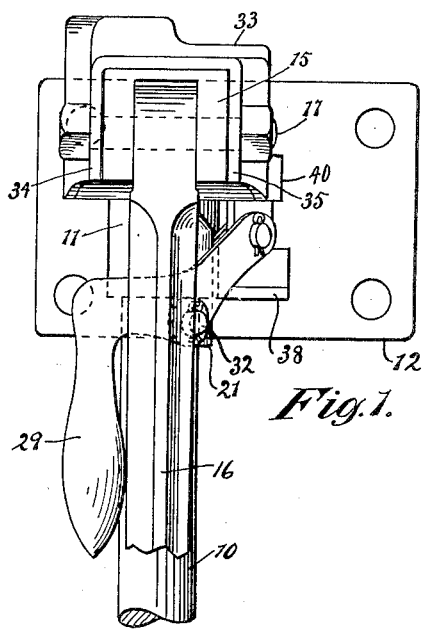
Figure 1 is an elevation of the upper end of the brake shaft and the operating handle.
Figure 3:
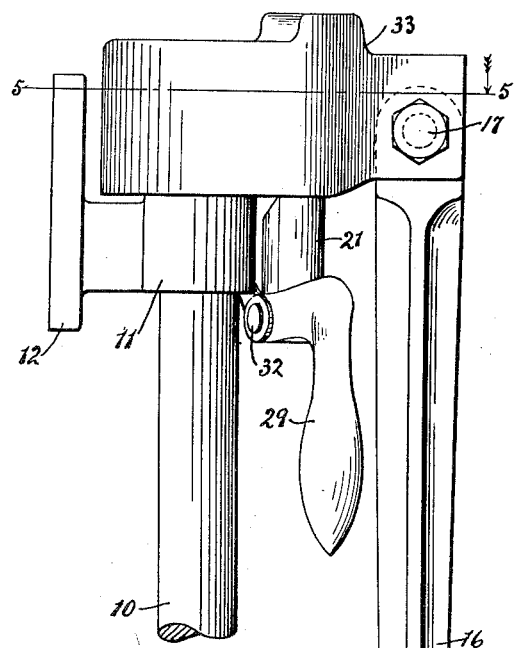
Fig. 3 is a plan view of the device.
Figure 3:
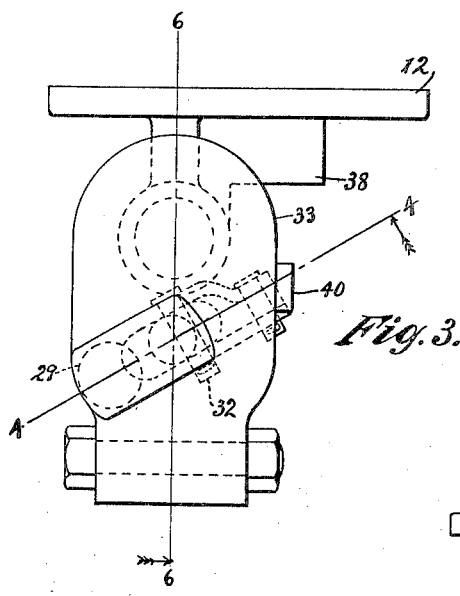
Figure 2:
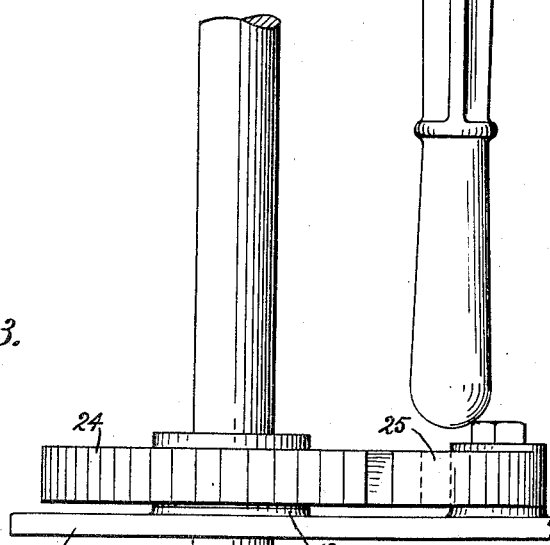
Fig. 2 is a detail side elevation of the device, including the holding mechanism.

The brake staff 10 is of the usual form in that its upper end is journaled in a suitable box 11, carried by a bracket plate 12 adapted to be secured to a fixed part of the car, its lower end being journaled in a suitable box, as 13, mounted on a floor plate 14. The staff will be, as usual, prolonged below the floor plate in order that there may be attached thereto the usual brake chain. This feature being of ordinary construction and not being a part of the present invention is not illustrated.

Upon the upper end of the staff 10 there is loosely mounted a chambered head 15, to which there is attached an operating handle 16 which is pivoted to the head, as shown at 17, for free movement in vertical planes. Within the chamber of the head 15 there is inclosed a ratchet element 18, taking the form of a wheel having its periphery transversely fluted, as shown at 19. The inner end of the head 15 is open, as shown in Fig. 6, for convenience in entering the wheel 18 into its chamber in assembling the parts.

The wheel 18 is fixed to the staff 10 as by means of a pin 20.

The dog for coöperating with the ratchet wheel comprises a bar 21, having a rounded face complementary to the flutes 19 with which it is adapted to make engagement. This bar passes through apertures 22, 23, formed, respectively, in the top and bottom walls of the head. These apertures are elongated, their longitudinal axes being tangential to the periphery of the ratchet member and their width being such as to provide a substantially snug fit for the dog. As the head 15 is swung to the left from the position of Fig. 5, by means of the handle 16, the dog is held in engagement with one of the flutes 19 of the ratchet element 18, the reaction being against the inner and outer margins of the apertures 22, 23, and the staff is consequently turned in the direction for winding up or setting the brake. On the reverse movement of the head, the staff being held by the usual ratchet 24 and coöperating pawl 25, the dog is cammed toward the outer ends of the apertures by the ratchet flutes.

In order to insure the normal positioning of the dog at the inner end of the apertures 22, 23, provision is made for causing it to move upwardly as it is shifted outwardly. This is accomplished, in the construction illustrated, by providing the upper end of the dog with a cam face 26, coöperating with a complementary face 27 formed at the margin of the outer end of the aperture 22, and a cam face 28, coöperating with a similar cam surface formed at the inner end of the aperture 23. The cams 26, 27, cause the return of the dog to the inner ends of the apertures when it is free to drop by gravity. A hand lever 29, pivotally attached at 32 to the dog 21, affords means for manually disengaging the dog from the ratchet member 18 and also contributes to the return movement of the dog to its normal position at the inner end of the apertures. The hand lever 29 may be used to prevent the return of the dog 21 into contact with the ratchet 18, as well as to remove the same after it has moved into contact therewith and, whether so operated by hand or under the influence of cam 38 described below, may be said to neutralize or prevent the action of the cams 26, 27, tending to urge the dog 21 toward the ratchet 18.

A cap 33 incloses the head 15 to protect it from the weather, and is held in place by any suitable means, as shown by being provided with a pair of outstanding ears 34, 35, through which the pivot bolt 17 of the operating handle passes. The top wall of the cap 33 is provided with a cam face 36, for engagement by a complementary face 37 formed at the upper end of the dog 21, these cams, together with the cam 28 and its mate, contributing to the outward movement of the dog when raised by the hand lever 29.

A releasing cam 38, formed on the wall plate 12, is engaged by the inner end portions 39 of the hand lever 29 when the head 15 is turned backwardly to the limit of the sweep of the operating lever 16, and thereby automatically raises the dog to disengage it from the ratchet member 18. The head 15 is preferably provided with a boss 40 for making contact with the bracket plate 12 to limit the backward movement of the head.

While the weighting of the dog 21 is shown as being provided by prolonging it downwardly beyond the head 15, and further by attaching to it the comparatively heavy operating handle 29, the counterweighting mass of metal may be otherwise disposed, especially if the inclosing cap be omitted.

By the construction described a simple, durable and highly efficient brake handle is provided, and the necessity for the use of springs, which are highly objectionable, is entirely obviated.

The invention may be embodied otherwise than as herein shown and described, but the form of construction disclosed is preferable to any which I have thus far designed.

I claim as my invention—

1. In a brake handle, in combination, a staff, a wheel fixed to the staff, a head oscillatable about the staff, a bar carried by the head and being positioned transverse to and engageable with the rim of the wheel and laterally movable in a path tangential thereto, and means for raising the bar as it moves away from the wheel.

2. In a brake handle, in combination, a staff, a wheel fixed to the staff, a head oscillatable about the staff, a bar carried by the head and being positioned transverse to and engageable with the rim of the wheel and laterally movable in a path tangential thereto, and a cam for raising the bar as it moves away from the wheel.

3. In a brake handle, in combination, a staff, a wheel fixed to the staff and having its rim face transversely fluted, a head oscillatable about the staff and inclosing the wheel, a bar carried by the head normally parallel and engageable with the face of the wheel and being laterally movable tangential to the wheel, and means for raising the bar as it moves away from the wheel.

4. In a brake handle, in combination, a staff, a wheel fixed to the staff and having its rim face transversely fluted, a head oscillatable about the staff and inclosing the wheel, a bar carried by the head normally parallel and engageable with the face of the wheel and being laterally movable tangential to the wheel, and a cam for raising the bar as it moves away from the wheel.

5. In a brake handle, in combination, a staff, a wheel fixed on the staff, a head oscillatable about the staff and inclosing the wheel and having a slot tangential thereto, a bar carried within the slot and positioned transversely to and being engageable with the rim face of the wheel, and means for raising the bar as it moves away from the wheel and for guiding it toward the wheel as it descends after elevation.

6. In a brake handle, in combination, a staff, a wheel fixed upon the staff and having its rim transversely fluted, a head inclosing the wheel and being oscillatable about the staff and having slots in its top and bottom walls tangential to the wheel, a bar extending through the slots and being movable laterally therein, and means urging the bar toward the wheel.

7. In a brake handle, in combination, a staff, a wheel fixed upon the staff and having its rim transversely fluted, a head inclosing the wheel and being oscillatable about the staff and having slots in its top and bottom walls tangential to the wheel, a bar extending through the slots and being movable laterally therein, and a cam for raising the bar as it is urged away from the wheel by the flutings thereof as the head turns in one direction and for guiding the bar toward the wheel as it descends after elevation.

8. In a brake handle, in combination, a staff, a wheel fixed upon the staff and having its rim transversely fluted, a head inclosing the wheel and being oscillatable about the staff and having slots in its top and bottom walls tangential to the wheel, a bar extending through the slots and being movable laterally therein, and means not dependent on the movement of the head for swinging the bar out of engagement with the wheel.

9. In a brake handle, in combination, a staff, a wheel fixed to the staff, a head inclosing the wheel and being oscillatable about the staff, a bar carried by the head and being positioned transverse to and engageable with the rim of the wheel and laterally movable in a path tangential thereto, and means acting on the bar as the head reaches the limit of its movement in one direction for disengaging the bar from the wheel.

10. In a brake handle, in combination, a staff, a wheel fixed to the staff, a head oscillatable on the staff, a longitudinally and laterally movable bar carried by the head and positioned transversely of the rim face of the wheel, means for guiding the bar away from and toward the wheel as it is raised and lowered, and a cam for raising the bar as the head reaches the limit of its movement in one direction.

11. In a brake handle, in combination, a staff, a wheel on said staff, a handle oscillatable about said wheel and having a slot forming an acute angle with the adjacent portion of said wheel, a member movable laterally in said slot, means urging the member into the angle between one side of the slot and the wheel, and means operable at will to neutralize the action of said first-named means for release of the brake.

12. In a brake handle, in combination, a staff, a wheel on said staff, a handle oscillatable about said wheel having a slot tangential to said wheel, a member movable laterally in said slot, means to move said member laterally, means to keep said member parallel with the face of said wheel while moving laterally, and means to neutralize the action of said first-named means for release of the brake.

13. In a brake handle, in combination, a staff, a wheel on said staff, said wheel having transverse depressions in its face, a handle oscillatable about said wheel having a slot tangential to said wheel, a member laterally movable in said slot, means causing said member to wedge between said depressions and one face of the slot upon movement of the handle in one direction, and means for forcibly removing said member from its wedged position while the parts are pressed thereagainst whereby to release the brake.

14. A brake handle comprising a staff, a wheel on said staff, a handle oscillatable about said wheel and having a bearing face movable with said handle arranged at an acute angle with the adjacent portion of the wheel and being oblique to the axis of the handle which intersects the center of the wheel and the inner end of the face, a wedging member moving with one of the parts adapted to prevent relative movement between the face and the wheel in one direction and to permit such motion in the opposite direction, continuously acting means urging said wedging member toward the apex of said angle, and means to forcibly move said wedging member away from said angle for release of the brake.

15. In a brake handle, in combination, a staff, a wheel fixed to the staff, a head oscillatable on the staff, a longitudinally and laterally movable bar carried by the head and positioned transversely of the rim face of the wheel, means for guiding the bar away from and toward the wheel as it is raised and lowered, and additional means for disengaging the bar from the wheel.

16. In a brake handle, in combination, a staff, a wheel fixed on the staff, an oscillatable head mounted on the staff, a gravity dog carried by the head and engageable with the wheel on the advance movement of the head and being moved laterally and upwardly on the backward movement of the head relatively to the wheel, and means for releasing the dog independently of such backward movement of the head.

17. In a brake handle, in combination, a staff, a wheel fixed on the staff, an oscillatable head mounted on the staff, a gravity dog carried by the head and engageable with the wheel on the advance movement of the head and being moved laterally and upwardly on the backward movement of the head relatively to the wheel, and means for automatically moving and holding the dog out of engagement with the wheel as the head reaches the limit of its backward movement.

18. In a brake handle, in combination, a staff, a wheel fixed upon the staff, a head inclosing the wheel and being oscillatable about the staff and having slots in its top and bottom walls tangential to the wheel, a bar extending through the slots and being movable laterally therein, and means urging the bar toward the wheel.

19. In a brake handle, in combination, a staff, a wheel fixed to the staff, a head oscillatable about the staff, a bar carried by the head and being positioned transverse to and engageable with the rim of the wheel and laterally movable in a path tangential thereto, means for moving the bar longitudinally, and means for causing the bar to move laterally away from the wheel when moved longitudinally by said means.

20. In a brake handle, in combination, a staff, a wheel fixed to said staff, a head oscillatable about said staff carrying a way tangential to said head, a wedging member traveling in said way and urged by gravity toward said wheel.

21. In a brake handle, in combination, a vertical staff, a wheel fixed to said staff, a head oscillatable about said staff, and wedging means carried by said head movable in a path tangential to said wheel and gravity urged toward said wheel.

NELS KROHN.